(12) United States Patent
K et al.

(10) Patent No.: US 11,968,082 B2
(45) Date of Patent: Apr. 23, 2024

(54) ROBUST NODE FAILURE DETECTION MECHANISM FOR SDN CONTROLLER CLUSTER

(71) Applicant: Telefonaktiebolaget LM Ericsson (publ), Stockholm (SE)

(72) Inventors: Faseela K, Bengaluru (IN); Muthukumaran Kothandaraman, Bangalore (IN); Vyshakh Krishnan C H, Bangalore (IN)

(73) Assignee: Teleonaktiebolaget LM Ericsson (Publ), Stockholm (SE)

( * ) Notice: Subject to any disclaimer, the term of this patent is extended or adjusted under 35 U.S.C. 154(b) by 38 days.

(21) Appl. No.: 17/041,246

(22) PCT Filed: Jun. 13, 2018

(86) PCT No.: PCT/IB2018/054345
§ 371 (c)(1),
(2) Date: Sep. 24, 2020

(87) PCT Pub. No.: WO2019/239189
PCT Pub. Date: Dec. 19, 2019

(65) Prior Publication Data
US 2021/0105178 A1 Apr. 8, 2021

(51) Int. Cl.
*H04L 41/0677* (2022.01)
*H04L 41/0668* (2022.01)
(Continued)

(52) U.S. Cl.
CPC ...... *H04L 41/0677* (2013.01); *H04L 41/0668* (2013.01); *H04L 43/0817* (2013.01); *H04L 45/42* (2013.01); *H04L 45/64* (2013.01)

(58) Field of Classification Search
CPC ............ H04L 41/0677; H04L 41/0668; H04L 43/0817; H04L 45/42; H04L 45/64; H04L 12/44; H04L 12/445
See application file for complete search history.

(56) References Cited

U.S. PATENT DOCUMENTS

| 8,509,097 B1 * | 8/2013 | Gourlay | ................. H04L 43/04 370/251 |
| 9,973,987 B2 | 5/2018 | Raman et al. | |

(Continued)

OTHER PUBLICATIONS

"Failover Mechanisms for Distributed SDN Controllers"; by Mathis Obadia et al.; Dec. 2014; IEEE SCNS 2014 Conference (Year: 2014).*

(Continued)

*Primary Examiner* — Kamal B Divecha
*Assistant Examiner* — Jihad K Boustany
(74) *Attorney, Agent, or Firm* — Weisberg I.P. Law, P.A.

(57) ABSTRACT

A method implemented by a first controller in a software defined networking (SDN) network to monitor a health of a second controller, where the first controller and the second controller are part of a cluster of controllers, where controllers in the cluster communicate with switches over an in-band network, and where controllers in the cluster communicate with each other over an out-of-band network. The method includes sending a first control message to a switch over the in-band network in response to a determination that the second controller cannot be reached over the out-of-band network, where the first control message includes a health check request message and an instruction for the switch to send the health check request message to the second controller, and where the switch is a designated switch that has a control channel connection to the first controller and the second controller over the in-band network.

8 Claims, 7 Drawing Sheets

(51) Int. Cl.
   *H04L 43/0817*   (2022.01)
   *H04L 45/42*   (2022.01)
   *H04L 45/64*   (2022.01)

(56) References Cited

U.S. PATENT DOCUMENTS

| | | | | |
|---|---|---|---|---|
| 2003/0233595 | A1* | 12/2003 | Charny | H04L 45/50 |
| | | | | 714/4.1 |
| 2007/0180105 | A1* | 8/2007 | Filsfils | H04L 41/069 |
| | | | | 709/224 |
| 2008/0080507 | A1* | 4/2008 | Swallow | H04L 41/344 |
| | | | | 370/392 |
| 2009/0310482 | A1* | 12/2009 | Asaie | G06F 11/1443 |
| | | | | 370/225 |
| 2014/0325038 | A1 | 10/2014 | Kis | |
| 2015/0131648 | A1* | 5/2015 | Shuman | H04L 65/1073 |
| | | | | 370/352 |
| 2015/0304205 | A1* | 10/2015 | Yuan | H04L 45/026 |
| | | | | 370/392 |
| 2015/0326452 | A1* | 11/2015 | Bucher | H04L 67/10 |
| | | | | 709/224 |
| 2016/0080342 | A1* | 3/2016 | Krauss | H04L 67/01 |
| | | | | 726/3 |
| 2016/0285750 | A1* | 9/2016 | Saquib | H04L 43/026 |
| 2016/0323204 | A1* | 11/2016 | DeSanti | H04L 61/5076 |
| 2017/0005947 | A1* | 1/2017 | Chu | H04L 45/24 |
| 2017/0019295 | A1* | 1/2017 | Kim | H04L 43/0817 |
| 2017/0118662 | A1* | 4/2017 | Rahman | H04W 24/00 |
| 2018/0219788 | A1* | 8/2018 | Wackerly | H04L 47/122 |
| 2020/0026624 | A1* | 1/2020 | Parthasarathy | G06F 11/2025 |

OTHER PUBLICATIONS

Obadia, et al., "Failover Mechanisms for Distributed SDN Controllers," 2014 International Conference and Workshop on the Network of the Future (NOF), IEEE, Dec. 3, 2014, pp. 1-6.
Open Networking Foundation, "OpenFlow Switch Specification," v1.3.1 (Wire Protocol 0x04), ONF TS-007, Section 6.3.4 "Multiple Controllers" Sep. 6, 2012, pp. 30-32.
EPO Communication dated Mar. 14, 2022 for Patent Application No. 18743078.0, consisting of 10-pages.
Chinese Office Action with English Machine translation dated Mar. 1, 2023 for patent Application No. 201880094516.3, consisting of 10-pages.

* cited by examiner

ROBUST NODE FAILURE DETECTION MECHANISM FOR SDN CONTROLLER CLUSTER

CROSS-REFERENCE TO RELATED APPLICATIONS

This application is a national stage of International Application No. PCT/IB2018/054345, filed Jun. 13, 2018, which is hereby incorporated by reference.

TECHNICAL FIELD

Embodiments of the invention relate to the field of software defined networking (SDN), and more specifically, to monitoring the health of SDN controllers in a cluster of controllers.

BACKGROUND ART

Software defined networking (SDN) is an approach to computer networking that employs a split architecture network in which the forwarding (data) plane is decoupled from the control plane. The use of a split architecture network simplifies the network devices (e.g., switches) implementing the forwarding plane by shifting the intelligence of the network into one or more controllers that oversee the switches. SDN facilitates rapid and open innovation at the network layer by providing a programmable network infrastructure.

An SDN network typically includes one or more controllers that oversee multiple switches. A controller can program the switches to implement the desired forwarding behavior. Controllers in an SDN network can form a cluster to provide high availability, reliability, and scalability compared to what a single controller can provide. The controllers in the cluster may communicate with switches in the SDN network over an in-band network (e.g., to exchange control plane information over a control channel using a southbound communications protocol such as OpenFlow) while the controllers in the cluster may communicate with each other over a dedicated out-of-band network that is separate from the in-band network. The controllers in the cluster may communicate over the out-of-band path to perform various management functions related to the cluster. For example, the controllers in the cluster can communicate over the out-of-band network to monitor the health of other controllers in the cluster and initiate appropriate switchovers and redistributions if it is determined that a controller in the cluster has failed (e.g., if a controller in the cluster fails, the workload of the failed controller can be redistributed to other controllers in the cluster). The cluster can use various health monitoring algorithms to determine the health of a controller in the cluster. For example, an algorithm may keep a history of failure statistics calculated based on heartbeat messages received from other controllers in the cluster. The algorithm may then analyze the failure statistics to determine whether a particular controller has a failure. The algorithm may calculate a phi value representing the likelihood that the particular controller has a failure based on a variety of different factors rather than just returning a simple "yes" or "no" answer.

However, with existing health monitoring solutions, when a controller cannot be reached over the out-of-band network, it is not possible to reliably determine whether this is due to the controller having a failure or the out-of-band network having a failure. For example, if a first controller stops receiving heartbeat messages from a second controller, the first controller is not able to determine whether the second controller itself has a failure or if the out-of-band network has a failure.

SUMMARY

A method is implemented by a first controller in a software defined networking (SDN) network to monitor a health of a second controller, where the first controller and the second controller are part of a cluster of controllers, where controllers in the cluster communicate with switches in the SDN network over an in-band network, and where controllers in the cluster communicate with each other over an out-of-band network that is separate from the in-band network. The method includes determining that the second controller cannot be reached over the out-of-band network and sending a first control message to a switch over the in-band network in response to a determination that the second controller cannot be reached over the out-of-band network, where the first control message includes a health check request message and an instruction for the switch to send the health check request message to the second controller, and where the switch is a designated switch that has a control channel connection to the first controller and the second controller over the in-band network.

A network device configured to function as a first controller in a software defined networking (SDN) network to monitor a health of a second controller, where the first controller and the second controller are part of a cluster of controllers, where controllers in the cluster communicate with switches in the SDN network over an in-band network, and where controllers in the cluster communicate with each other over an out-of-band network that is separate from the in-band network. The network device includes a set of one or more processors and a non-transitory machine-readable storage medium having stored therein a monitoring component. The monitoring component, when executed by the set of one or more processors, causes the network device to determine that the second controller cannot be reached over the out-of-band network and send a first control message to a switch over the in-band network in response to a determination that the second controller cannot be reached over the out-of-band network, where the first control message includes a health check request message and an instruction for the switch to send the health check request message to the second controller, and where the switch is a designated switch that has a control channel connection to the first controller and the second controller over the in-band network.

A non-transitory machine-readable medium has computer code stored therein, which when executed by a set of one or more processors of a network device functioning as a first controller in a software defined networking (SDN) network, causes the first controller to perform operations for monitoring a second controller, where the first controller and the second controller are part of a cluster of controllers, where controllers in the cluster communicate with each other over an out-of-band network dedicated for controller-to-controller communications, and where controllers in the cluster communicate with switches in the SDN network over an in-band network that is separate from the out-of-band network. The operations include determining that the second controller cannot be reached over the out-of-band network and sending a first control message to a switch over the in-band network in response to a determination that the second controller cannot be reached over the out-of-band network, where the first control message includes a health check request message and an instruction for the switch to send the health check request message to the second controller, and where the switch is a designated switch that has a control channel connection to the first controller and the second controller over the in-band network.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
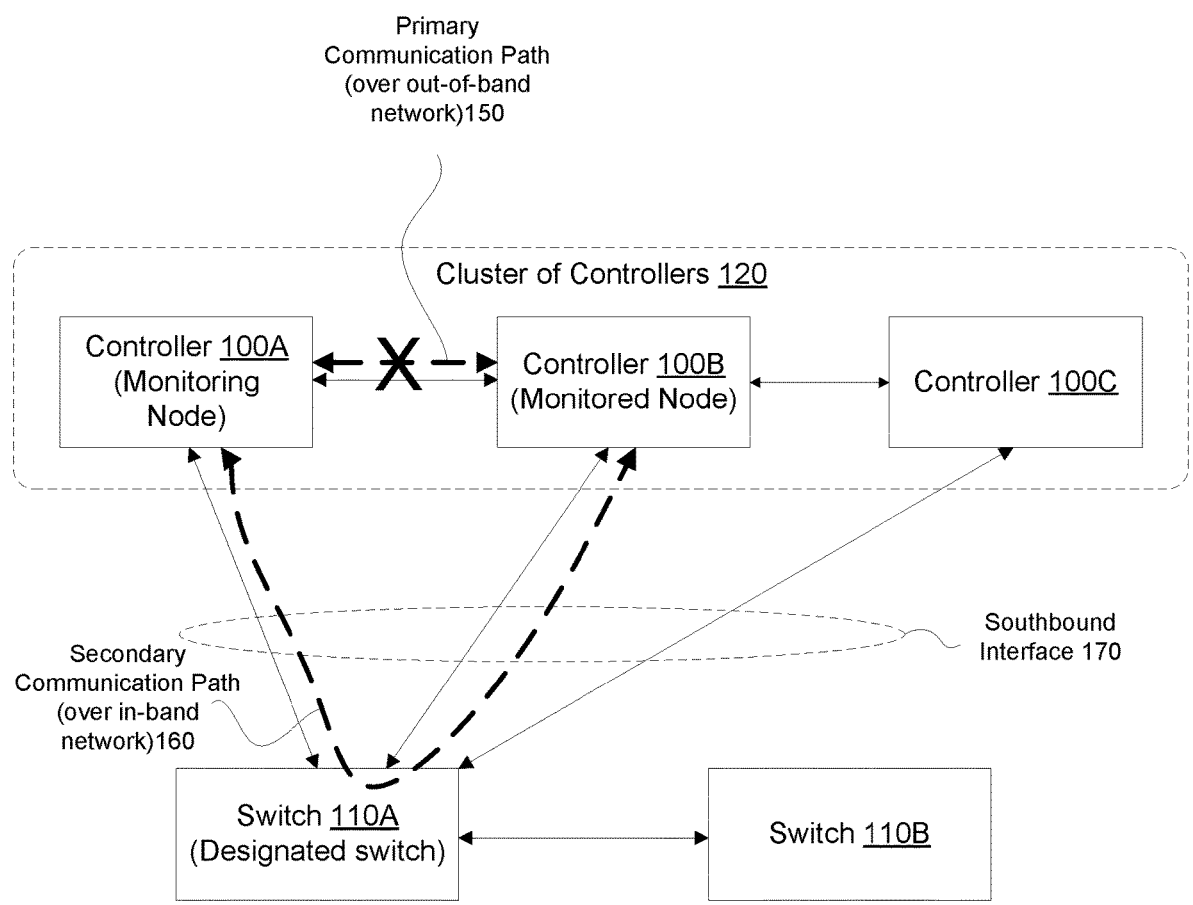
FIG. 1 is a block diagram of an SDN network in which the health of a controller in a cluster can be monitored over an in-band network, according to some embodiments.

The following description describes methods and apparatus for monitoring the health of SDN controllers in a cluster of controllers. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, multiple controllers in an SDN network can form a cluster to provide high availability, reliability, and scalability compared to what a single controller can provide. The controllers in the cluster may communicate with switches in the SDN network over an in-band network to manage the switches while the controllers in the cluster may communicate with each other over a dedicated out-of-band network that is separate from the in-band network. The controllers in the cluster may communicate over the out-of-band path to perform various management functions related to the cluster including, but not limited to, monitoring the health of other controllers in the cluster (e.g., to detect when a controller has a failure). However, with existing health monitoring solutions, when a controller cannot be reached over the out-of-band network, it is not possible to reliably determine whether this is due to the controller having a failure or the out-of-band network having a failure.

Embodiments disclosed in overcome the disadvantages of existing solutions by providing a mechanism for a first controller in a cluster to monitor the health of a second controller in the cluster over the in-band network in the event that the second controller cannot be reached over the out-of-band network. If the second controller is reachable over the in-band network, then this may rule out the possibility that the second controller itself has a failure. If the second controller is unreachable over the out-of-band network and the in-band network, then this increases the likelihood that the second controller itself has a failure, as opposed to the out-of-band network having a failure.

According to some embodiments, if the first controller in the cluster determines that the second controller in the cluster cannot be reached over the out-of-band network, then the first controller sends a first control message to a designated switch over the in-band network, where the first control message includes a health check request message and an instruction for the switch to send the health check request message to the second controller. The designated switch is a switch that has been previously designated to facilitate communications between controllers in the cluster over the in-band network. For this purpose, the designated switch may have been configured to connect to all of the controllers in the cluster (including the first controller and the second controller). Upon receiving the first control message, the switch sends a second control message to the second controller over the in-band network, where the second control message includes the health check request message. The second controller may then extract the health check request message from the second control message. In this manner, embodiments enable the first controller to send the health check request message to the second controller over the in-band network via the designated switch (e.g., in the event that the second controller cannot be reached over the out-of-band network). According to some embodiments, upon receiving the health check request message from the first controller, the second controller responds by sending a health check acknowledgement message to the first controller over the in-band network using a similar mechanism as the one described above (via the designated switch). Various embodiments are further described and claimed herein below.

FIG. 1 is a block diagram of an SDN network in which the health of a controller in a cluster can be monitored over an in-band network, according to some embodiments. As shown in the diagram, the SDN network includes a cluster of controllers 120 and switches 110A and 110B. In this example, the cluster 120 includes controller 100A, controller 100B, and controller 100C. While the cluster 120 is shown in the diagram as including three controllers 100, it should be understood that other embodiments may include a different number of controllers 100. The controllers 100 in the cluster 120 may communicate with switches 110 over an in-band network to manage the forwarding behavior of the switches 110 and/or to exchange other types of control channel communications. For example, the controllers 100 may control the forwarding behavior of the switches 110 over a southbound interface 170 using a southbound communications protocol such as OpenFlow (over the in-band network). As used herein, an in-band network refers to a network that is used for control channel communications between controllers 100 and switches 110 in an SDN network. While various embodiments are described in a context where OpenFlow is used as the southbound communications protocol, it should be understood that the techniques described herein can be implemented using other southbound communications protocols.

The cluster 120 provides high availability, reliability, and scalability compared to what a single controller can provide. The controllers 100 in the cluster 120 may communicate with each other over an out-of-band network that is separate from the in-band network. As used herein, an out-of-band network is a network that is physically and/or logically separate from the in-band network (e.g., that is dedicated for controller-to-controller communications). The controllers 100 in the cluster 120 may communicate over the out-of-band network to perform various management functions related to the cluster 120 including, but not limited to, monitoring the health of other controllers 100 in the cluster 120. In one embodiment, each controller 100 in the cluster 120 may be responsible for monitoring the health of one or more other controllers 100 in the cluster 120. A controller 100 that is responsible for monitoring the health of another controller 100 in the cluster 120 may be referred to as a monitoring node with respect to the controller 100 being monitored, while the controller 100 being monitored may be referred to as a monitored node. In this example, controller 100A is responsible for monitoring the health of controller 100B so controller 100A is the monitoring node and controller 100B is the monitored node.

In one embodiment, controller 100A may initially monitor the health of controller 100B over the out-of-band network (e.g., using a primary communication path 150). For example, controller 100B may monitor the health of controller 100B by sending a health check request message to controller 100B over the out-of-band network. If controller 100A subsequently receives a health check acknowledgement message from controller 100B over the out-of-band network, then controller 100A may determine that controller 100B is healthy. However, if controller 100A does not receive a health check acknowledgement message from controller 100B (e.g., within a certain period of time from sending the health check request message), then controller 100A may determine that controller 100B cannot be reached over the out-of-band network and that a failure may have occurred (e.g., either controller 100B itself has a failure or the out-of-band network has a failure). In one embodiment, controller 100A determines that controller 100B cannot be reached over the out-of-band network if controller 100B has not responded to a threshold number of consecutive health check request messages.

In one embodiment, if controller 100A determines that it cannot reach controller 100B over the out-of-band network, then it may attempt to reach controller 100B over the in-band network. For this purpose, in one embodiment, one or more switches 110 in the SDN network are designated to facilitate communications between controllers 100 over the in-band network. Such a switch 110 may be referred to as a designated switch. One or more switches 110 can be designated as being a designated switch, for example, by the operator or based on an algorithm run by the controllers 100 in the cluster 120. In one embodiment, a designated switch is configured to connect to all of the controllers 100 in the cluster 120. In one embodiment, this can be achieved using OpenFlow high availability capabilities, where multiple controllers 100 have OFPCR_ROLE_EQUAL role. In this example, switch 110A is a designated switch, and has a control channel connection (over the in-band network) to each of the controllers 100 in the cluster 120. If controller 100A determines that it cannot reach controller 100B over the out-of-band network (e.g., using the primary communication path 150), then controller 100A may attempt to reach controller 100B over the in-band network via switch 110A, which is a designated switch (e.g., using a secondary (backup) communication path 160). In one embodiment, controller 100A achieves this by sending a first control message to switch 110A over the in-band network, where the first control message includes a health check request message and an instruction for the switch 110A to send the health check request message to controller 100B. In an embodiment where OpenFlow is used as the southbound communications protocol, the first control message is an OpenFlow Packet-Out message and the instruction for the switch 110A to send the health check request message to controller 100B is an OpenFlow action for switch 110A to output (punt) the message to controller 100B. In response to receiving the first control message, switch 110A sends the health check request message to controller 100B according to the instruction included in the first control message. In one embodiment, switch 110A achieves this by sending a second control message to controller 100B over the in-band network, where the second control message includes the health check request message. In an embodiment where OpenFlow is used as the southbound communications protocol, the second control message is an OpenFlow Packet-In message. Controller 100B may then extract the health check request message from the second control message. In this manner, controller 100A is able to send the health check request message to controller 100B over the in-band network (e.g., using the secondary communication path 160) via switch 110A. Switch 110A can thus provide in-band forwarding for controllers 100A and 100B. This provides an advantage over existing health monitoring solutions, which only allow controllers 100 to send health monitoring messages (e.g., health check request messages and health check acknowledgement messages) over the out-of-band network. Embodiments provide more robust health monitoring by allowing health monitoring to be performed over the in-band network in the event that the out-of-band network has a failure.

In one embodiment, upon receiving the health check request message from controller 100A, controller 100B responds by sending a health check acknowledgement message to controller 100A. In one embodiment, if controller 100B receives the health check request message over the in-band network, then controller 100B may also send the health check acknowledgement over the in-band network. For example, controller 100B may achieve this by sending a third control message to switch 110A over the in-band network, where the third control message includes the health check acknowledgement message and an instruction for switch 110A to send the health check acknowledgement message to controller 100A. In an embodiment where OpenFlow is used as the southbound communications protocol, the third control message is an OpenFlow Packet-Out message and the instruction for switch 110A to send the health check acknowledgement message to controller 100A is an OpenFlow action to output (punt) the message to controller 100A. In response to receiving the third control message, switch 110A sends the health check acknowledgement message to controller 100A according to the instruction included in the third control message. In one embodiment, switch 110A achieves this by sending a fourth control message to controller 100A over the in-band network, where the fourth control message includes the health check acknowledgement message. In an embodiment where OpenFlow is used as the southbound communications protocol, the fourth control message is an OpenFlow Packet-In message. Controller 100A may then extract the health check acknowledgement message from the fourth control message.

In one embodiment, if controller 100A does not receive a health check acknowledgement message from controller 100B over the out-of-band network, but receives a health check acknowledgement message from controller 100B over the in-band network, it determines that the out-of-band network has a failure (as opposed to controller 100B itself having a failure). In one embodiment, if controller 100A does not receive a health check acknowledgement message from controller 100B over the out-of-band network and the in-band network (e.g., within a specified period of time and/or after repeated attempts of sending health check request messages to controller 100B), it determines that controller 100B itself may have a failure (as opposed to the out-of-band network having a failure). In this manner, controller 100A may be able to distinguish between controller failures and network failures. This provides an advantage over existing health monitoring solutions, which are not able to distinguish between controller failures and network failures. Another advantage of embodiments described herein is that they leverage existing SDN constructs (e.g., control messages sent over southbound interface) to provide the in-band backup path, and thus do not depend on the specific clustering algorithms implemented in the cluster 120.

For purpose of illustration, an embodiment having a single designated switch (switch 110A) is shown in the diagram. It should be understood, however, that other embodiments may have multiple designated switches 110 to create additional in-band paths, and controllers 100 can attempt to reach other controllers 100 (e.g., for health monitoring purposes) using multiple in-band paths (e.g., via different designated switches).

Figure 2:
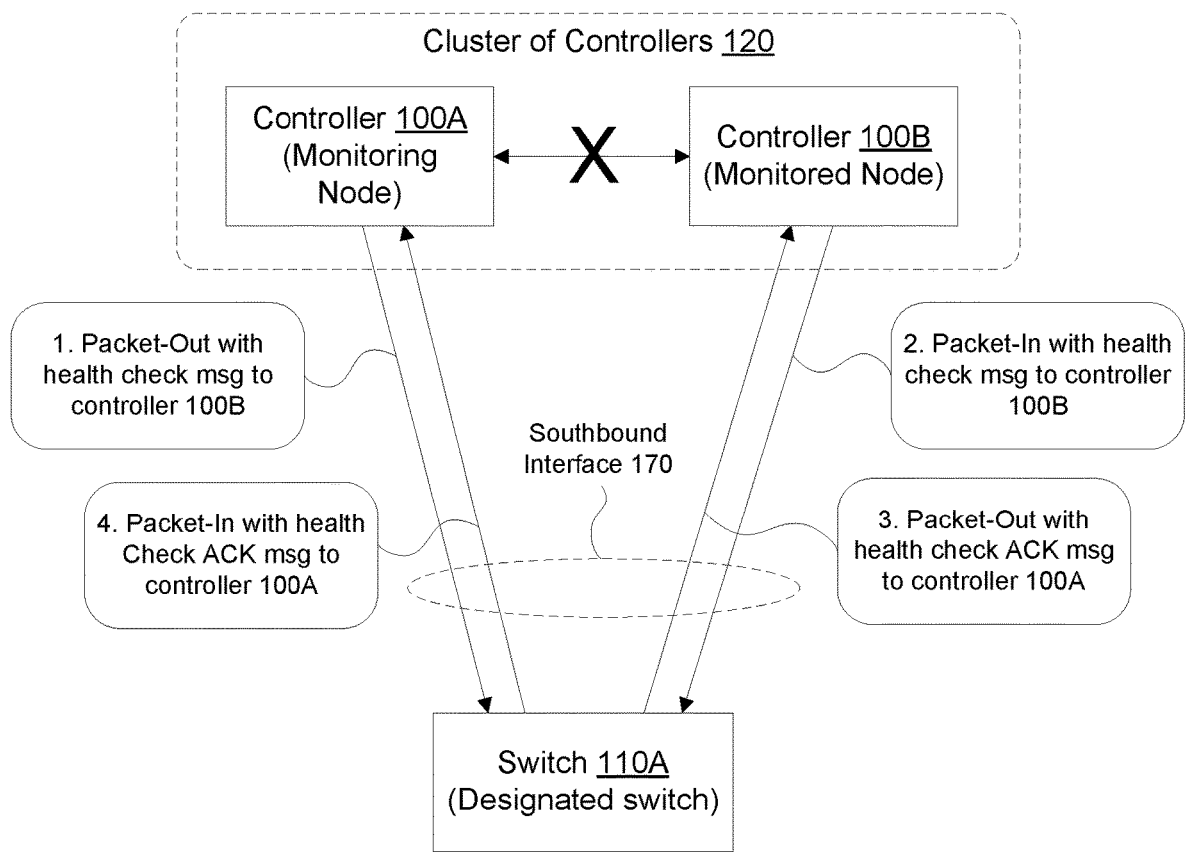
FIG. 2 is a block diagram illustrating a messaging sequence for monitoring the health of a controller in a cluster over an in-band network, according to some embodiments.

FIG. 2 is a block diagram illustrating a messaging sequence for monitoring the health of a controller in a cluster over an in-band network, according to some embodiments. The diagram specifically illustrates an exemplary messaging sequence that uses OpenFlow over the southbound interface 170. In this example, controller 100A is the monitoring node and controller 100B is the monitored node. The messaging sequence can be used by controller 100A to monitor the health of controller 100B when controller 100A cannot reach controller 100B over the out-of-band network. At step 1, controller 100A sends a Packet-Out message to switch 110A over the in-band network (over southbound interface 170) that includes a health check message and an instruction for switch 110A to send the health check request message to controller 100B (e.g., an OpenFlow action to output the message to controller 100B). In this example switch 110A is a designated switch, and thus has control channel connections (over the in-band network) to both controller 100A and controller 100B. At step 2, switch 110A sends a Packet-In message to controller 100B over the in-band network that includes the health check message. At step 3, controller 100B sends a Packet-Out message to controller 100A that includes a health check acknowledgement (ACK) message (acknowledging the health check request message sent by controller 100A) and an instruction for switch 110A to send the health check acknowledgement message to controller 100A (e.g., an OpenFlow action to output the message to controller 100A). At step 4, switch 110A sends a Packet-In message to controller 100A that includes the health check acknowledgement message. This messaging sequence allows controller 100A to monitor the health of controller 100B over the in-band network (over southbound interface 170) via switch 110A.

Figure 3:
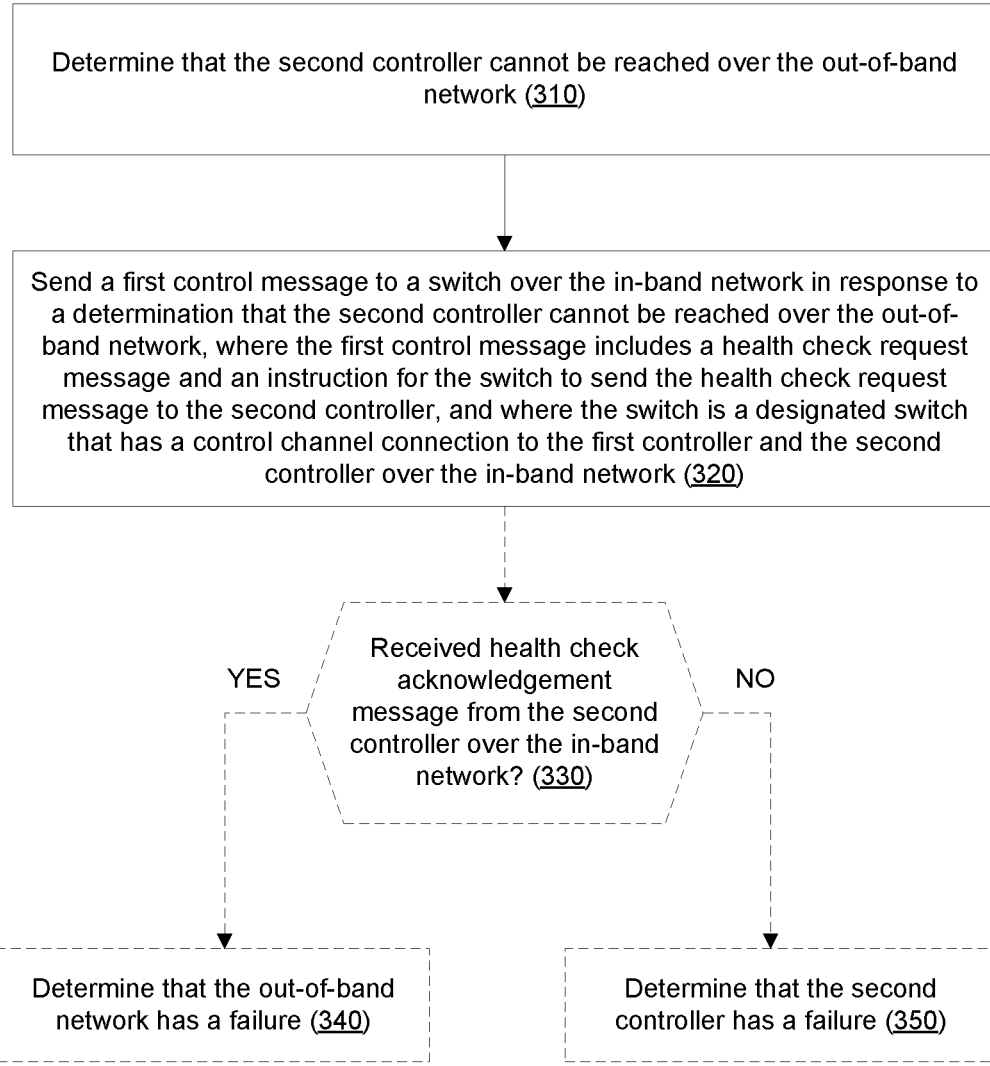
FIG. 3 is a flow diagram of a process in an SDN network to monitor the health of a controller in a cluster over an in-band network, according to some embodiments.

FIG. 3 is a flow diagram of a process in an SDN network to monitor the health of a controller in a cluster over an in-band network, according to some embodiments. The operations in the flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams. In one embodiment, the process is implemented by a first controller (e.g., controller 100A) in a cluster (e.g., cluster 120) that is responsible for monitoring the health of a second controller (e.g., controller 100B) in the cluster (the first controller is the monitoring node and the second controller is the monitored node). In one embodiment, the controllers in the cluster communicate with switches (e.g., switches 110) in the SDN network over an in-band network, while the controllers in the cluster communicate with each other over an out-of-band network that is separate from the in-band network.

In one embodiment, the process is initiated when the first controller determines, at block 310, that the second controller cannot be reached over the out-of-band network. In one embodiment, the first controller determines that the second controller cannot be reached over the out-of-band network if the second controller has not responded to a threshold number of consecutive health check request messages sent to the second controller over the out-of-band network.

At block 320, the first controller sends a first control message to a switch over the in-band network in response to a determination that the second controller cannot be reached over the out-of-band network, where the first control message includes a health check request message and an instruction for the switch to send the health check request message to the second controller, and where the switch is a designated switch (e.g., switch 110A) that has a control channel connection to both the first controller and the second controller over the in-band network. In one embodiment, the first controller and the switch communicate using a southbound communications protocol such as OpenFlow. In an embodiment where the southbound communications protocol being used is OpenFlow, the first control message may be an Packet-Out message and the instruction for the switch to send the health check request message to the second controller may be an OpenFlow action to output (punt) the health check request message to the second controller. In one embodiment, the first controller identifies the switch to be a designated switch and configures the switch to establish a control channel connection to all controllers in the cluster.

In one embodiment, at decision block 330, the first controller determines whether it has received a health check acknowledgement message from the second controller over the in-band network. If the first controller determines that it has received a health check acknowledgement message from the second controller over the in-band network, then at block 340, the first controller determines that the out-of-band network has a failure (as opposed to the second controller itself having a failure). In one embodiment, the health check acknowledgement message is included in a second control message sent by the switch to the first controller over the in-band network. In an embodiment where the southbound communications protocol being used is OpenFlow, the second control message may be a Packet-In message.

Returning to decision block 330, if the first controller determines that it has not received a health check acknowledgement message from the second controller over the in-band network (e.g., within a specified period of time after the health check request message was sent to the second controller), then at block 350, the first controller determines that the second controller has a failure.

Figure 4:
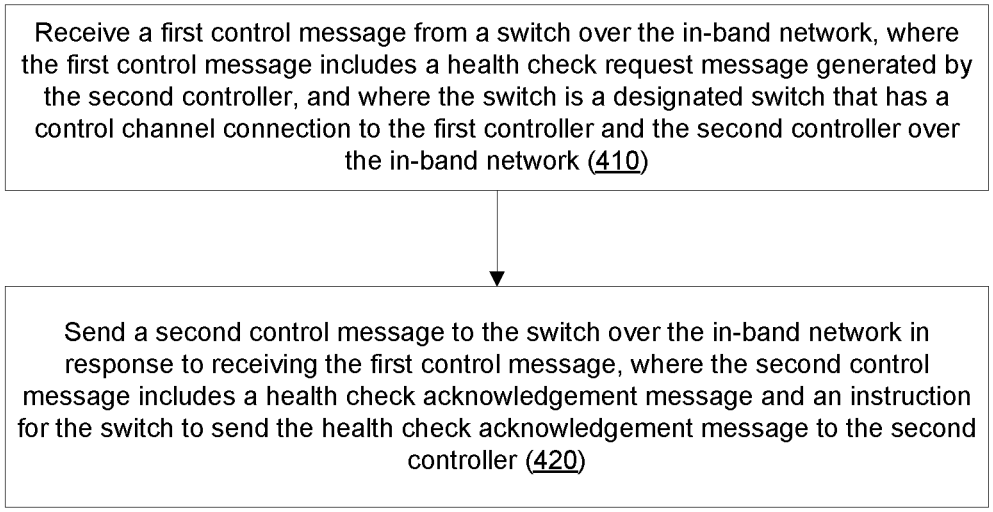
FIG. 4 is a flow diagram of a process in an SDN network to support controller health monitoring over an in-band network, according to some embodiments.

FIG. 4 is a flow diagram of a process in an SDN network to support controller health monitoring over an in-band network, according to some embodiments. In one embodiment, the process is implemented by a first controller (e.g., controller 100B) in the cluster (e.g., cluster 120) that is being monitored by a second controller (e.g., controller 100A) in the cluster (the first controller is the monitored node and the second controller is the monitoring node). In one embodiment, the controllers in the cluster communicate with switches (e.g., switches 110) in the SDN network over an in-band network while the controllers in the cluster communicate with each other over an out-of-band network that is separate from the in-band network.

In one embodiment, the process is initiated when the first controller, at block 410, receives a first control message from a switch over the in-band network, where the first control message includes a health check request message generated by the second controller, and where the switch is a designated switch (e.g., switch 110A) that has a control channel connection to both the first controller and the second controller.

At block 420, the first controller sends a second control message to the switch over the in-band network in response to receiving the first control message, where the second control message includes a health check acknowledgement message and an instruction for the switch to send the health check acknowledgement message to the second controller. In one embodiment, the first controller and the switch communicate using a southbound communications protocol such as OpenFlow. In an embodiment where the southbound communications protocol being used is OpenFlow, the first control message may be a Packet-Out message and the instruction for the switch to send the health check request message to the second controller may be an OpenFlow action to output (punt) the health check acknowledgement message to the second controller.

Figure 5A:
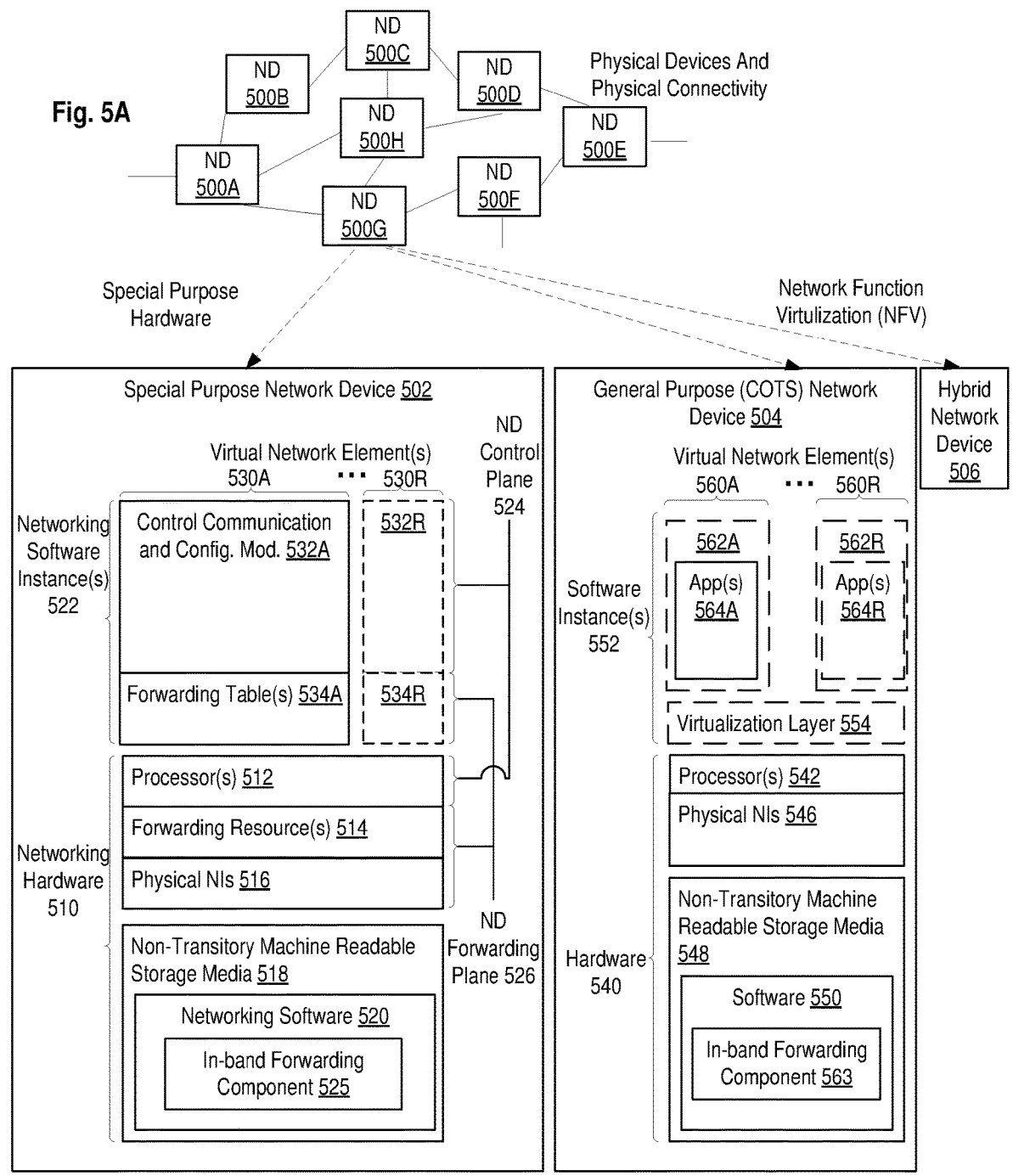
FIG. 5A illustrates connectivity between network devices (NDs) within an exemplary network, as well as three exemplary implementations of the NDs, according to some embodiments.

FIG. 5A illustrates connectivity between network devices (NDs) within an exemplary network, as well as three exemplary implementations of the NDs, according to some embodiments. FIG. 5A shows NDs 500A-H, and their connectivity by way of lines between 500A-500B, 500B-500C, 500C-500D, 500D-500E, 500E-500F, 500F-500G, and 500A-500G, as well as between 500H and each of 500A, 500C, 500D, and 500G. These NDs are physical devices, and the connectivity between these NDs can be wireless or wired (often referred to as a link). An additional line extending from NDs 500A, 500E, and 500F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application—specific integrated—circuits (ASICs) and a special-purpose operating system (OS); and 2) a general purpose network device 504 that uses common off-the-shelf (COTS) processors and a standard OS.

The special-purpose network device 502 includes networking hardware 510 comprising a set of one or more processor(s) 512, forwarding resource(s) 514 (which typically include one or more ASICs and/or network processors), and physical network interfaces (NIs) 516 (through which network connections are made, such as those shown by the connectivity between NDs 500A-H), as well as non-transitory machine readable storage media 518 having stored therein networking software 520. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

Software 520 can include code such as in-band forwarding component 525, which when executed by networking hardware 510, causes the special-purpose network device 502 to perform operations of one or more embodiments described herein above as part networking software instances 522 (e.g., to provide in-band forwarding among controllers when the special-purpose network device 502 functions as a designated switch).

The special-purpose network device 502 is often physically and/or logically considered to include: 1) a ND control plane 524 (sometimes referred to as a control plane) comprising the processor(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the processor(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

Figure 5B:
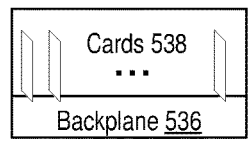
FIG. 5B illustrates an exemplary way to implement a special-purpose network device according to some embodiments.

FIG. 5B illustrates an exemplary way to implement the special-purpose network device 502 according to some embodiments. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and physical NIs 546, as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization. For example, in one such alternative embodiment the virtualization layer 554 represents the kernel of an operating system (or a shim executing on a base operating system) that allows for the creation of multiple instances 562A-R called software containers that may each be used to execute one (or more) of the sets of applications 564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 554 represents a hypervisor (sometimes referred to as a virtual machine monitor (VMM)) or a hypervisor executing on top of a host operating system, and each of the sets of applications 564A-R is run on top of a guest operating system within an instance 562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 540, directly on a hypervisor (in which case the unikernel is sometimes described as running within a LibOS virtual machine), or in a software container, embodiments can be implemented fully with unikernels running directly on a hypervisor represented by virtualization layer 554, unikernels running within software containers represented by instances 562A-R, or as a combination of unikernels and the above-described techniques (e.g., unikernels and virtual machines both run directly on a hypervisor, unikernels and sets of applications that are run in different software containers).

The instantiation of the one or more sets of one or more applications 564A-R, as well as virtualization if implemented, are collectively referred to as software instance(s) 552. Each set of applications 564A-R, corresponding virtualization construct (e.g., instance 562A-R) if implemented, and that part of the hardware 540 that executes them (be it hardware dedicated to that execution and/or time slices of hardware temporally shared), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 562A-R to VNEs also apply to embodiments where such a finer level of granularity and/or unikernels are used.

In certain embodiments, the virtualization layer 554 includes a virtual switch that provides similar forwarding services as a physical Ethernet switch. Specifically, this virtual switch forwards traffic between instances 562A-R and the physical NI(s) 546, as well as optionally between the instances 562A-R; in addition, this virtual switch may enforce network isolation between the VNEs 560A-R that by policy are not permitted to communicate with each other (e.g., by honoring virtual local area networks (VLANs)).

Software 550 can include code such as in-band forwarding component 563, which when executed by processor(s) 542, cause the general purpose network device 504 to perform operations of one or more embodiments described herein above as part software instances 562A-R (e.g., to provide in-band forwarding among controllers when the general purpose network device 504 functions as a designated switch).

The third exemplary ND implementation in FIG. 5A is a hybrid network device 506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 5C:
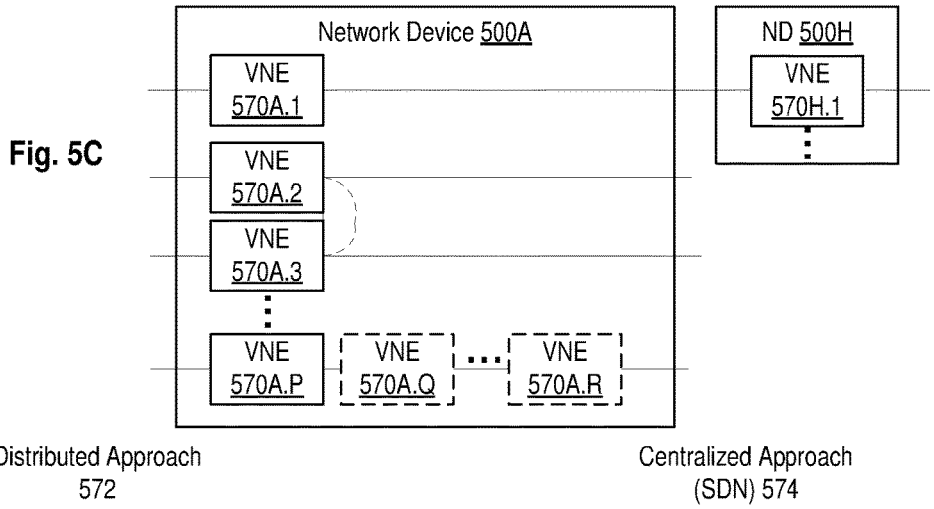
FIG. 5C illustrates various exemplary ways in which virtual network elements (VNEs) may be coupled according to some embodiments.

FIG. 5C illustrates various exemplary ways in which VNEs may be coupled according to some embodiments. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software instances 562A-R may operate as servers; the same would be true for the hybrid network device 506; in the case of the special-purpose network device 502, one or more such servers could also be run on a virtualization layer executed by the processor(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 5D:
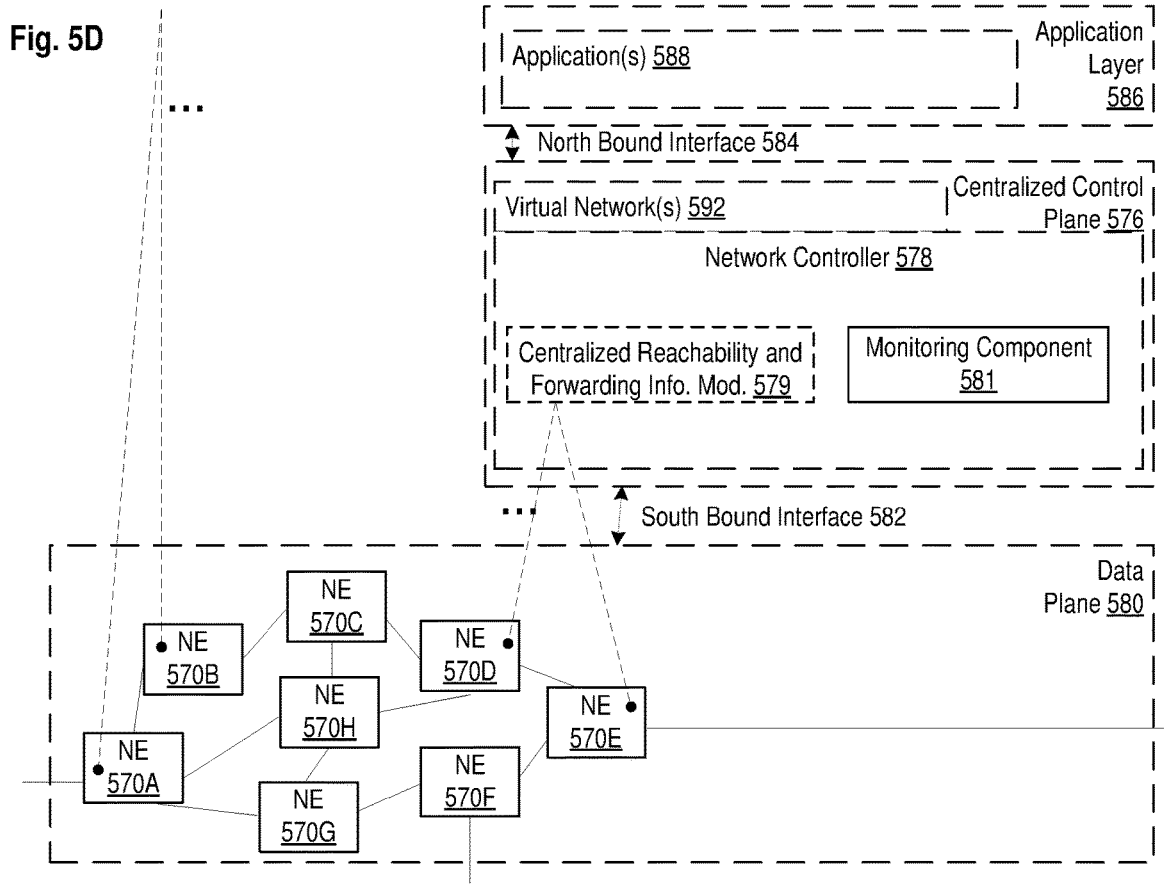
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 570A-H (e.g., the processor(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs.

In one embodiment, the network controller 578 may include a monitoring component 581 that when executed by the network controller 578, causes the network controller 578 to perform operations of one or more embodiments described herein above (e.g., to monitor the health of other network controllers in the same cluster 120 over an in-band network).

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the processor(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
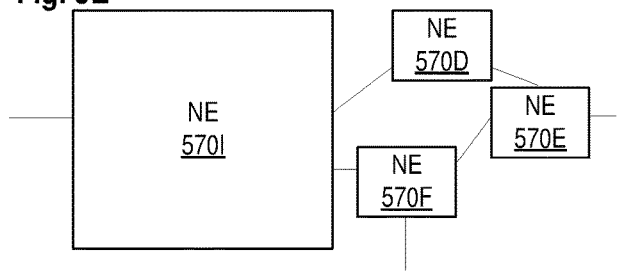
FIG. 5E illustrates the simple case of where each of the NDs implements a single NE, but a centralized control plane has abstracted multiple of the NEs in different NDs into (to represent) a single NE in one of the virtual network(s), according to some embodiments.
Figure 5F:
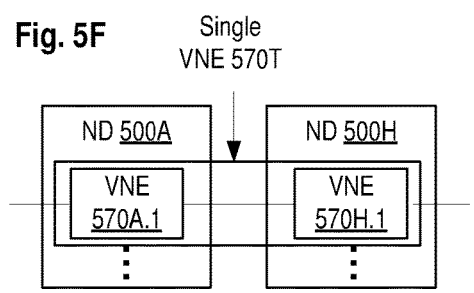
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments. Thus, the abstraction of a NE or VNE can span multiple NDs.

While some embodiments implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
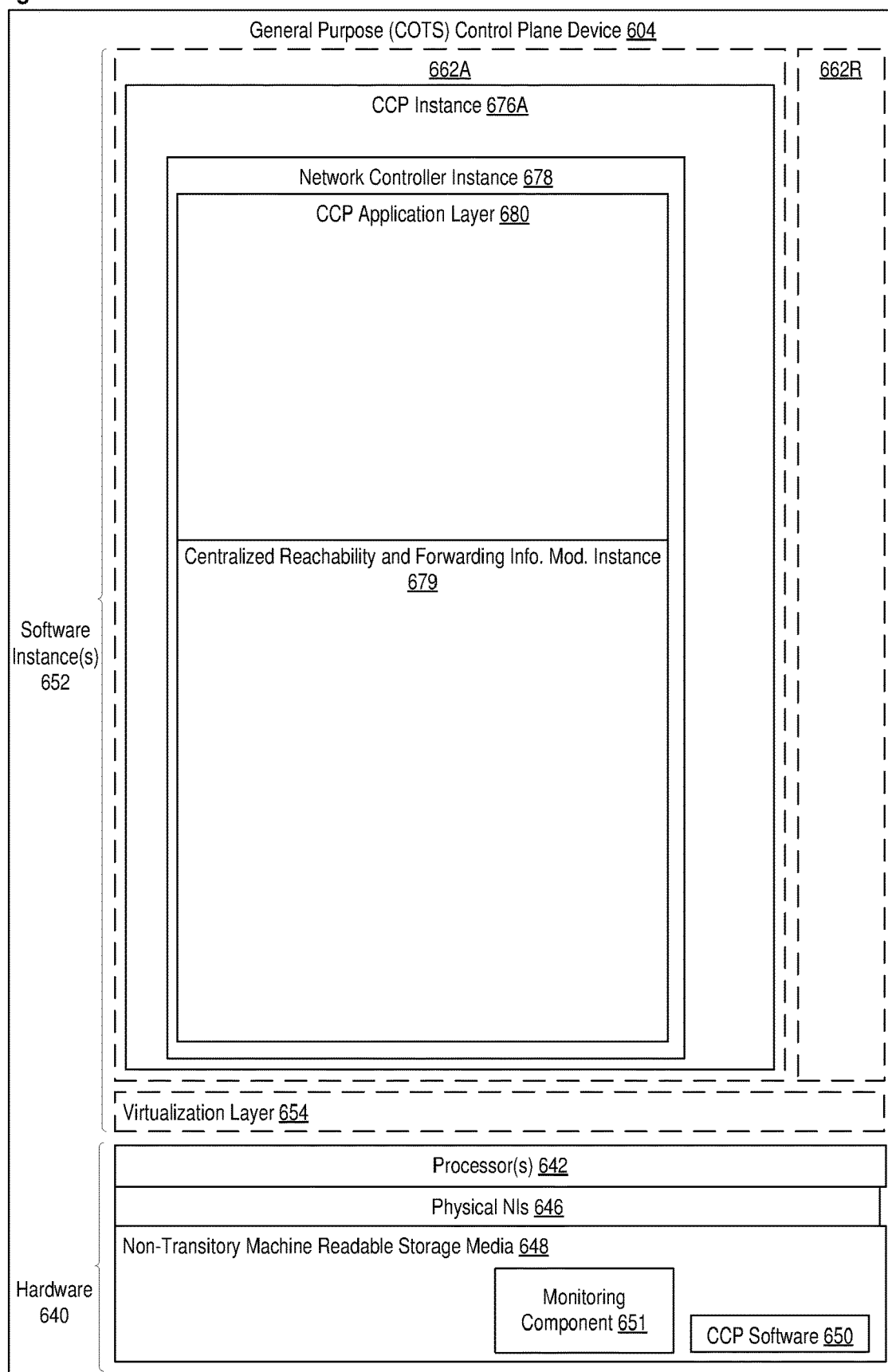
FIG. 6 illustrates a general purpose control plane device with centralized control plane (CCP) software 650, according to some embodiments.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and physical NIs 646, as well as non-transitory machine readable storage media 648 having stored therein centralized control plane (CCP) software 650 and a monitoring component 651.

In embodiments that use compute virtualization, the processor(s) 642 typically execute software to instantiate a virtualization layer 654 (e.g., in one embodiment the virtualization layer 654 represents the kernel of an operating system (or a shim executing on a base operating system) that allows for the creation of multiple instances 662A-R called software containers (representing separate user spaces and also called virtualization engines, virtual private servers, or jails) that may each be used to execute a set of one or more applications; in another embodiment the virtualization layer 654 represents a hypervisor (sometimes referred to as a virtual machine monitor (VMM)) or a hypervisor executing on top of a host operating system, and an application is run on top of a guest operating system within an instance 662A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 640, directly on a hypervisor represented by virtualization layer 654 (in which case the unikernel is sometimes described as running within a LibOS virtual machine), or in a software container represented by one of instances 662A-R). Again, in embodiments where compute virtualization is used, during operation an instance of the CCP software 650 (illustrated as CCP instance 676A) is executed (e.g., within the instance 662A) on the virtualization layer 654. In embodiments where compute virtualization is not used, the CCP instance 676A is executed, as a unikernel or on top of a host operating system, on the "bare metal" general purpose control plane device 604. The instantiation of the CCP instance 676A, as well as the virtualization layer 654 and instances 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user—interfaces). At a more abstract level, this CCP application layer 680 within the centralized control plane 576 works with virtual network view(s) (logical view(s) of the network) and the middleware layer provides the conversion from the virtual networks to the physical view.

The monitoring component 651 can be executed by hardware 640 to perform operations of one or more embodiments described herein above as part of software instances 652 (e.g., to monitor the health of other network controllers in the same cluster 120 over an in-band network).

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments as described herein.

An embodiment may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed by a first controller in a software defined networking (SDN) network to monitor a health of a second controller, the first controller and the second controller being part of a cluster of controllers, controllers in the cluster communicating with switches in the SDN network over an in-band network, and controllers in the cluster communicating with each other over an out-of-band network that is separate from the in-band network, the method comprising:
    determining, by the first controller, that the second controller cannot be reached over the out-of-band network;
    sending, by the first controller, a first control message to a switch over the in-band network in response to a determination that the second controller cannot be reached over the out-of-band network, the first control message including a health check request message and an instruction for the switch to send the health check request message to the second controller, and the switch being a designated switch that has a control channel connection to the first controller and the second controller over the in-band network;
    determining, by the first controller, whether a health check acknowledgement message has been received from the switch, the health check acknowledgement message comprising an acknowledgement received by the switch from the second controller over the in-band network in response to the health check request sent by the switch to the second controller;
    determining, by the first controller, that the out-of-band network has a failure in response to a determination that the health check acknowledgement message has been received from the second controller over the in-band network, the health check acknowledgement message being included in a second control message sent by the switch to the first controller over the in-band network;
    configuring, by the first controller, the switch to establish a control channel connection to all controllers in the cluster;
    receiving, by the first controller, a third control message from the switch over the in-band network, the third control message including a health check request message generated by a third controller in the cluster, the switch having a control channel connection to the third controller;
    sending, by the first controller, a fourth control message to the switch over the in-band network in response to receiving the third control message, the fourth control message including a health check acknowledgement message and an instruction for the switch to send the health check acknowledgement message to the third controller; and
    determining, by the first controller, that the second controller has a failure in response to a determination that the health check acknowledgement message has not been received from the second controller over the in-band network.

2. The method of claim 1, wherein the first controller and the switch communicate over the in-band network using a southbound communications protocol.

3. The method of claim 2, wherein the southbound communications protocol is OpenFlow.

4. The method of claim 3, wherein the first control message is a Packet-Out message and the second control message is a Packet-In message.

5. A network device configured to function as a first controller in a software defined networking (SDN) network and to monitor a health of a second controller, the first controller and the second controller being part of a cluster of controllers, controllers in the cluster communicating with switches in the SDN network over an in-band network, and controllers in the cluster communicating with each other over an out-of-band network that is separate from the in-band network, the network device comprising:
    a set of one or more processors; and
    a non-transitory machine-readable storage medium having stored therein a monitoring component, which when executed by the set of one or more processors, causes the first controller to determine that the second controller cannot be reached over the out-of-band network and send a first control message to a switch over the in-band network in response to a determination that the second controller cannot be reached over the out-of-band network, the first control message including a health check request message and an instruction for the switch to send the health check request message to the second controller, and the switch being a designated switch that has a control channel connection to the first controller and the second controller over the in-band network, and the monitoring component, when executed by the set of one or more processors, further causes the first controller to determine that the out-of-band network has a failure in response to a determination that the health check acknowledgement message has been received from the second controller over the in-band network, the health check acknowledgement message being included in a second control message sent by the switch to the first controller over the in-band network, configure the switch to establish a control channel connection to all controllers in the cluster, receive a third control message from the switch over the in-band network, the third control message including a health check request message generated by a third controller in the cluster, the switch having a control channel connection to the third controller, send a fourth control message to the switch over the in-band network in response to receiving the third control message, the fourth control message including a health check acknowledgement message and an instruction for the switch to send the health check acknowledgement message to the third controller, and determine that the second controller has a failure in response to a determination that the health check acknowledgement message has not been received from the second controller over the in-band network.

6. The network device of claim 5, wherein the health check acknowledgement message is included in a second control message sent by the switch to the first controller over the in-band network, wherein the first controller and the switch communicate over the in-band network using Open- Flow, and wherein the first control message is a Packet-Out message and the second control message is a Packet-In message.

7. A non-transitory machine-readable medium having computer code stored therein, which when executed by a set of one or more processors of a network device configured to function as a first controller in a software defined networking (SDN) network, causes the first controller to perform operations for monitoring a second controller, the first controller and the second controller being part of a cluster of controllers, controllers in the cluster communicating with each other over an out-of-band network dedicated for controller-to-controller communications, and controllers in the cluster communicating with switches in the SDN network over an in-band network that is separate from the out-of-band network, the operations comprising:

determining that the second controller cannot be reached over the out-of-band network;

sending a first control message to a switch over the in-band network in response to a determination that the second controller cannot be reached over the out-of-band network, the first control message including a health check request message and an instruction for the switch to send the health check request message to the second controller, and the switch being a designated switch that has a control channel connection to the first controller and the second controller over the in-band network, and the monitoring component, when executed by the set of one or more processors, further causes the first controller to determine that the out-of-band network has a failure in response to a determination that the health check acknowledgement message has been received from the second controller over the in-band network, the health check acknowledgement message being included in a second control message sent by the switch to the first controller over the in-band network;

configuring the switch to establish a control channel connection to all controllers in the cluster;

receiving a third control message from the switch over the in-band network, the third control message including a health check request message generated by a third controller in the cluster, the switch having a control channel connection to the third controller; and sending a fourth control message to the switch over the in-band network in response to receiving the third control message, the fourth control message including a health check acknowledgement message and an instruction for the switch to send the health check acknowledgement message to the third controller; and determining that the second controller has a failure in response to a determination that the health check acknowledgement message has not been received from the second controller over the in-band network.

8. The non-transitory machine-readable medium of claim 7, wherein the health check acknowledgement message is included in a second control message sent by the switch to the first controller over the in-band network, wherein the first controller and the switch communicate over the in-band network using OpenFlow, and wherein the first control message is a Packet-Out message and the second control message is a Packet-In message.

* * * * *